United States Patent
Patry et al.

(10) Patent No.: US 8,830,553 B2
(45) Date of Patent: Sep. 9, 2014

(54) EDGE SEALS FOR, AND PROCESSES FOR ASSEMBLY OF, ELECTRO-OPTIC DISPLAYS

(75) Inventors: Shamus Ford Patry, Vernon, CT (US); Richard J. Paolini, Jr., Framingham, MA (US); Thomas H. Whitesides, Victoria (CA); Robert W. Zehner, Los Gatos, CA (US); Jonathan D. Albert, Philadelphia, PA (US); Harit Doshi, Waltham, MA (US)

(73) Assignee: E Ink Corporation, Billerica, MA (US)

( * ) Notice: Subject to any disclaimer, the term of this patent is extended or adjusted under 35 U.S.C. 154(b) by 232 days.

(21) Appl. No.: 13/430,128

(22) Filed: Mar. 26, 2012

(65) Prior Publication Data

US 2012/0176664 A1    Jul. 12, 2012

Related U.S. Application Data

(62) Division of application No. 12/955,254, filed on Nov. 29, 2010, now Pat. No. 8,208,193, which is a division of application No. 12/471,829, filed on May 26, 2009, now Pat. No. 7,898,717, which is a division of application No. 11/426,077, filed on Jun. 23, 2006, now Pat. No. 7,554,712.

(60) Provisional application No. 60/595,332, filed on Jun. 23, 2005, provisional application No. 60/595,957, filed on Aug. 19, 2005.

(51) Int. Cl.
*G02F 1/07* (2006.01)
*G02B 26/00* (2006.01)
*B82Y 20/00* (2011.01)

(52) U.S. Cl.
CPC ...................... *B82Y 20/00* (2013.01)
USPC .......................................... 359/245; 359/296

(58) Field of Classification Search
USPC ............. 359/245, 296; 345/107; 430/32; 204/600
See application file for complete search history.

(56) References Cited

U.S. PATENT DOCUMENTS

| | | | |
|---|---|---|---|
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,262,301 A | 4/1981 | Erlichman | |
| 4,418,346 A | 11/1983 | Batchelder | |
| 5,745,094 A | 4/1998 | Gordon, II et al. | |
| 5,760,761 A | 6/1998 | Sheridon | |
| 5,777,782 A | 7/1998 | Sheridon | |
| 5,808,783 A | 9/1998 | Crowley | |
| 5,872,552 A | 2/1999 | Gordon, II et al. | |

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner* — William Choi
(74) *Attorney, Agent, or Firm* — David J. Cole (57) ABSTRACT

An electro-optic display comprises a backplane; a layer of electro-optic material disposed adjacent the backplane; a protective layer; and a sealing layer of a metal or a ceramic extending between the backplane and the protective layer, and thus sealing the layer of electro-optic material from the outside environment.

14 Claims, 3 Drawing Sheets

(56) References Cited

U.S. PATENT DOCUMENTS

| | | |
|---|---|---|
| 5,930,026 A | 7/1999 | Jacobson et al. |
| 5,961,804 A | 10/1999 | Jacobson et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,370,019 B1 | 4/2002 | Matthies et al. |
| 6,376,828 B1 | 4/2002 | Comiskey |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,521,489 B2 | 2/2003 | Duthaler et al. |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,664,944 B1 | 12/2003 | Albert et al. |
| 6,665,107 B2 | 12/2003 | Forgette et al. |
| D485,294 S | 1/2004 | Albert |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,738,050 B2 | 5/2004 | Comiskey et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,657 B1 | 3/2005 | Fitzmaurice et al. |
| 6,870,661 B2 | 3/2005 | Pullen et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,075,703 B2 | 7/2006 | O'Neil et al. |
| 7,079,305 B2 | 7/2006 | Paolini, Jr. et al. |
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,352,353 B2 | 4/2008 | Albert et al. |
| 2002/0060321 A1 | 5/2002 | Kazlas et al. |

(56) References Cited

U.S. PATENT DOCUMENTS

| | | |
|---|---|---|
| 2002/0090980 A1 | 7/2002 | Wilcox et al. |
| 2002/0113770 A1 | 8/2002 | Jacobson et al. |
| 2003/0011560 A1 | 1/2003 | Albert et al. |
| 2003/0102858 A1 | 6/2003 | Jacobson et al. |
| 2003/0151702 A1 | 8/2003 | Morrison et al. |
| 2004/0085619 A1* | 5/2004 | Wu et al. ............. 359/296 |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0180476 A1 | 9/2004 | Kazlas et al. |
| 2004/0190114 A1 | 9/2004 | Jacobson et al. |
| 2004/0196215 A1 | 10/2004 | Duthaler et al. |
| 2004/0209008 A1 | 10/2004 | Liang et al. |
| 2004/0219306 A1 | 11/2004 | Wang et al. |
| 2004/0226820 A1 | 11/2004 | Webber et al. |
| 2004/0252360 A1 | 12/2004 | Webber et al. |
| 2004/0257635 A1 | 12/2004 | Paolini, Jr. et al. |
| 2004/0263947 A1 | 12/2004 | Drzaic et al. |
| 2005/0001810 A1 | 1/2005 | Yakushiji et al. |
| 2005/0001812 A1 | 1/2005 | Amundson et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0067656 A1 | 3/2005 | Denis et al. |
| 2005/0099672 A1 | 5/2005 | Jacobson et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0122564 A1 | 6/2005 | Zehner et al. |
| 2005/0134554 A1 | 6/2005 | Albert et al. |
| 2005/0151709 A1 | 7/2005 | Jacobson et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0190137 A1 | 9/2005 | Duthaler et al. |
| 2005/0212747 A1 | 9/2005 | Amundson |
| 2005/0219184 A1 | 10/2005 | Zehner et al. |
| 2005/0253777 A1 | 11/2005 | Zehner et al. |
| 2005/0259068 A1 | 11/2005 | Nihei et al. |
| 2005/0270261 A1 | 12/2005 | Danner et al. |
| 2005/0280626 A1 | 12/2005 | Amundson et al. |
| 2006/0007527 A1 | 1/2006 | Paolini, Jr. et al. |
| 2006/0023296 A1 | 2/2006 | Whitesides et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0223282 A1 | 10/2006 | Amundson et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0263927 A1 | 11/2006 | Sakurai et al. |
| 2006/0279527 A1 | 12/2006 | Zehner et al. |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).
Au, J. et al., "Ultra-Thin 3.1-in. Active-Matrix Electronic Ink Display for Mobile Devices", IDW'02, 223 (2002).
Bach, U., et al., "Nanomaterials-Based Electrochromics for Paper-Quality Displays", Adv. Mater, 14(11), 845 (2002).
Bouchard, A. et al., "High-Resolution Microencapsulated Electrophoretic Display on Silicon", SID 04 Digest, 651 (2004).
Caillot, E. et al. "Active Matrix Electrophoretic Information Display for High Performance Mobile Devices", IDMC Proceedings (2003).
Chen, Y., et al., "A Conformable Electronic Ink Display using a Foil-Based a-Si TFT Array", SID 01 Digest, 157 (Jun. 2001).
Comiskey, B., et al., "An electrophoretic ink for all-printed reflective electronic displays", Nature, 394, 253 (1998).
Comiskey, B., et al., "Electrophoretic Ink: A Printable Display Material", SID 97 Digest (1997), p. 75.
Danner, G.M. et al., "Reliability Performance for Microencapsulated Electrophoretic Displays with Simulated Active Matrix Drive", SID 03 Digest, 573 (2003).
Drzaic, P., et al., "A Printed and Rollable Bistable Electronic Display", SID 98 Digest (1998), p. 1131.
Duthaler, G., et al., "Active-Matrix Color Displays Using Electrophoretic Ink and Color Filters", SID 02 Digest, 1374 (2002).
Gates, H. et al., "A5 Sized Electronic Paper Display for Document Viewing", SID 05 Digest, (2005).
Hayes, R.A., et al., "Video-Speed Electronic Paper Based on Electrowetting", Nature, vol. 425, Sep. 25, pp. 383-385 (2003).
Henzen, A. et al., "An Electronic Ink Low Latency Drawing Tablet", SID 04 Digest, 1070 (2004).
Henzen, A. et al., "Development of Active Matrix Electronic Ink Displays for Handheld Devices", SID 03 Digest, 176, (2003).
Henzen, Aa. et al., "Development of Active Matrix Electronic Ink Displays for Smart Handheld Applications", IDW'02, 227 (2002).
Jacobson, J., et al., "The last book", IBM Systems J., 36, 457 (1997).
Jo, G-R, et al., "Toner Display Based on Particle Movements", Chem. Mater, 14, 664 (2002).
Johnson, M. et al., "High Quality Images on Electronic Paper Displays", SID 05 Digest, 1666 (2005).
Kazlas, P. et al., "Card-size Active-matrix Electronic Ink Display", Eurodisplay 2002, 259 (2002).
Kazlas, P., et al., "12.1 SVGA Microencapsulated Electrophoretic Active Matrix Display for Information Applicances", SID 01 Digest, 152 (Jun. 2001).
Kitamura, T., et al., "Electrical toner movement for electronic paper-like display", Asia Display/IDW '01, p. 1517, Paper HCS1-1 (2001).
O'Regan, B. et al., "A Low Cost, High-efficiency Solar Cell Based on Dye-sensitized colloidal TiO2 Films", Nature, vol. 353, Oct. 24, 1991, 773-740.
Pitt, M.G., et al., "Power Consumption of Microencapsulated Electrophoretic Displays for Smart Handheld Applications", SID 02 Digest, 1378 (2002).
Webber, R., "Image Stability in Active-Matrix Microencapsulated Electrophoretic Displays", SID 02 Digest, 126 (2002).
Whitesides, T. et al., "Towards Video-rate Microencapsulated Dual-Particle Electrophoretic Displays", SID 04 Digest, 133 (2004).
Wood, D., "An Electrochromic Renaissance?" Information Display, 18(3), 24 (Mar. 2002).
Yamaguchi, Y., et al., "Toner display using insulative particles charged triboelectrically", Asia Display/IDW '01, p. 1729, Paper AMD4-4 (2001).
Zehner, R. et al., "Drive Waveforms for Active Matrix Electrophoretic Displays", SID 03 Digest, 842 (2003).

\* cited by examiner

EDGE SEALS FOR, AND PROCESSES FOR ASSEMBLY OF, ELECTRO-OPTIC DISPLAYS

CROSS REFERENCE TO RELATED APPLICATIONS

This application is a divisional of copending application Ser. No. 12/955,254, filed Nov. 29, 2010 (Publication No. 2011/0069370), which itself is a divisional of application Ser. No. 12/471,829, filed May 26, 2009 (Publication No. 2009/0231661, now U.S. Pat. No. 7,898,717, issued Mar. 1, 2011), which itself is a divisional of application Ser. No. 11/426,077, filed Jun. 23, 2006 (Publication No. 2006/0291034, now U.S. Pat. No. 7,554,712, issued Jun. 30, 2009), which itself claims benefit of Provisional Application Ser. No. 60/595,332, filed Jun. 23, 2005, and of Provisional Application Ser. No. 60/595,957, filed Aug. 19, 2005.

This application is related to application Ser. No. 10/249,957, filed May 22, 2003 (Publication No. 2004/0027327, now U.S. Pat. No. 6,982,178), application Ser. No. 10/605,024, filed Sep. 2, 2003 (Publication No. 2004/0155857, now U.S. Pat. No. 7,561,324), application Ser. No. 10/904,063, filed Oct. 21, 2004 (Publication No. 2005/0105159, now U.S. Pat. No. 7,110,164), and application Ser. No. 10/905,582, filed Jan. 12, 2005 (Publication No. 2005/0168801, now U.S. Pat. No. 7,075,703). The entire disclosures of the aforementioned applications, and of all U.S. patents and published and copending applications referred to below, are also herein incorporated by reference.

BACKGROUND OF INVENTION

This invention relates to edge seals for, and processes and sub-assemblies for assembly of, electro-optic displays; the invention also relates to apparatus for use in such processes. The edge seals, processes and sub-assemblies of the present invention are especially intended for use with bistable electro-optic displays, particularly, but not exclusively, encapsulated electrophoretic displays. However, the edge seals of the present invention can also be used with other types of electro-optic displays in which the electro-optic medium which is solid, in the sense that it has solid external surfaces, although the medium may, and often does, have internal cavities which contain a fluid (either liquid or gas). Thus, the term "solid electro-optic displays" includes encapsulated electrophoretic displays, encapsulated liquid crystal displays, and other types of displays discussed below. The assembly processes of the present invention are primarily intended for use in the manufacture of electro-optic displays, for example encapsulated electrophoretic displays, using electro-optic media which can be coated on to a substrate.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in the aforementioned 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, Vol. 425, pages 383-385 (25 Sep. 2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles in a liquid medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,220; 6,958,848; 6,967,640; 6,982,178; 6,987,603; 6,995,550; 7,002,728; 7,012,600; 7,012,735; 7,023,430; 7,030,412; 7,030,854; 7,034,783; and 7,038,655; and U.S. Patent Applications Publication Nos. 2002/0060321; 2002/0090980; 2002/0113770; 2002/0180687; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0252360; 2004/0257635; 2004/0263947; 2005/0000813; 2005/0001812; 2005/0007336; 2005/0012980; 2005/0017944; 2005/0018273; 2005/0024353; 2005/0035941; 2005/0062714; 2005/0067656; 2005/0078099; 2005/0099672; 2005/0105159; 2005/0105162; 2005/0122284; 2005/0122306; 2005/0122563; 2005/0122564; 2005/0122565; 2005/0134554; 2005/0146774; 2005/0151709; 2005/0152018; 2005/0152022; 2005/0156340; 2005/0168799; 2005/0168801; 2005/0179642; 2005/0190137; 2005/0212747; 2005/0213191; 2005/0219184; 2005/0253777; 2005/0270261; 2005/0280626; 2006/0007527; 2006/0007528; 2006/0023296; 2006/0024437; and 2006/0038772; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

Other types of electro-optic materials may also be used in the present invention. Of particular interest, bistable ferroelectric liquid crystal displays (FLC's) are known in the art.

In addition to the layer of electro-optic material, an electro-optic display normally comprises at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display useable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

In the processes described above, the lamination of the substrate carrying the electro-optic layer to the backplane may advantageously be carried out by vacuum lamination. Vacuum lamination is effective in expelling air from between the two materials being laminated, thus avoiding unwanted air bubbles in the final display; such air bubbles may introduce undesirable artifacts in the images produced on the display. However, vacuum lamination of the two parts of an electro-optic display in this manner imposes stringent requirements upon the lamination adhesive used, as described in U.S. Pat. Nos. 6,657,772 and 6,831,769, especially in the case of a display using an encapsulated electrophoretic medium. The lamination adhesive must have sufficient adhesive strength to bind the electro-optic layer to the layer (typically an electrode layer) to which it is to be laminated, and in the case of an encapsulated electrophoretic medium, the adhesive should also have sufficient adhesive strength to mechanically hold the capsules together. If the electro-optic display is to be of a flexible type (and one of the important advantages of rotating bichromal member and encapsulated electrophoretic displays is that they can be made flexible), the adhesive must have sufficient flexibility not to introduce defects into the display when the display is flexed. The lamination adhesive must have adequate flow properties at the lamination temperature to ensure high quality lamination, and in this regard, the demands of laminating encapsulated electrophoretic and some other types of electro-optic media are unusually difficult; the lamination has be conducted at a temperature of not more than about 130° C. since the medium cannot be exposed to substantially higher temperatures without damage, but the flow of the adhesive must cope with the relatively uneven surface of the capsule-containing layer, the surface of which is rendered irregular by the underlying capsules. The lamination adhesive must be chemically compatible with all the other materials in the display.

In considering the choice of a lamination adhesive for use in an electro-optic display, attention must be paid to the process by which the display is to be assembled. Most prior art methods for final lamination of electrophoretic displays are essentially batch methods in which the electro-optic medium, the lamination adhesive and the backplane are only brought together immediately prior to final assembly, and it is desirable to provide methods better adapted for mass production. However, the aforementioned U.S. Pat. No. 6,982,178 describes a method of assembling a solid electro-optic display (including a particle-based electrophoretic display) which is well adapted for mass production. Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 μm), preferably about 2 to about 10 mil (51 to 254 μm). The electrically-conductive layer is conveniently a thin metal layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate previously described. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display.

The aforementioned U.S. Pat. No. 6,982,178 also describes the importance of protecting the electro-optic medium from environmental contaminants, since some electro-optic media are sensitive to humidity and ultra-violet radiation, and most such media are susceptible to mechanical damage. This patent illustrates, in FIG. 10, a process in which a protective film is laminated over a front plane laminate in the same lamination operation by which the front plane laminate is laminated to a backplane; such a protective film can protect the electro-optic medium against ingress of moisture, other liquids, and some gases. However, even with such a protective film, the edge of the electro-optic medium is still exposed to the environment, and this patent teaches that it is also advisable for the display to include an edge seal, which serves to prevent the ingress of moisture and other contaminants around the outer edges of the display. Various types of edge seal are illustrated in FIGS. 11-17 of this patent. This edge seal can be composed of metallized foil or other barrier foil adhered over the edge of the FPL, dispensed sealants (thermal, chemical, and/or radiation cured), polyisobutylene or acrylate-based sealants, and so on. It has been found that hybrid radiation and thermal cure sealants (i.e. UV curable with thermal post-bake) offer certain advantages to display system performance. Threebond 30Y-491 material (from Threebond Corporation, Cincinnati, Ohio) is especially preferred because of its favorable water vapor barrier properties, low viscosity at elevated temperature, for easy dispensing of the edge seal material, good wetting characteristics, and manageable curing properties. Those skilled in the art and familiar with advanced sealants will be able to identify other sealants that offer comparable performance.

Figure 1:
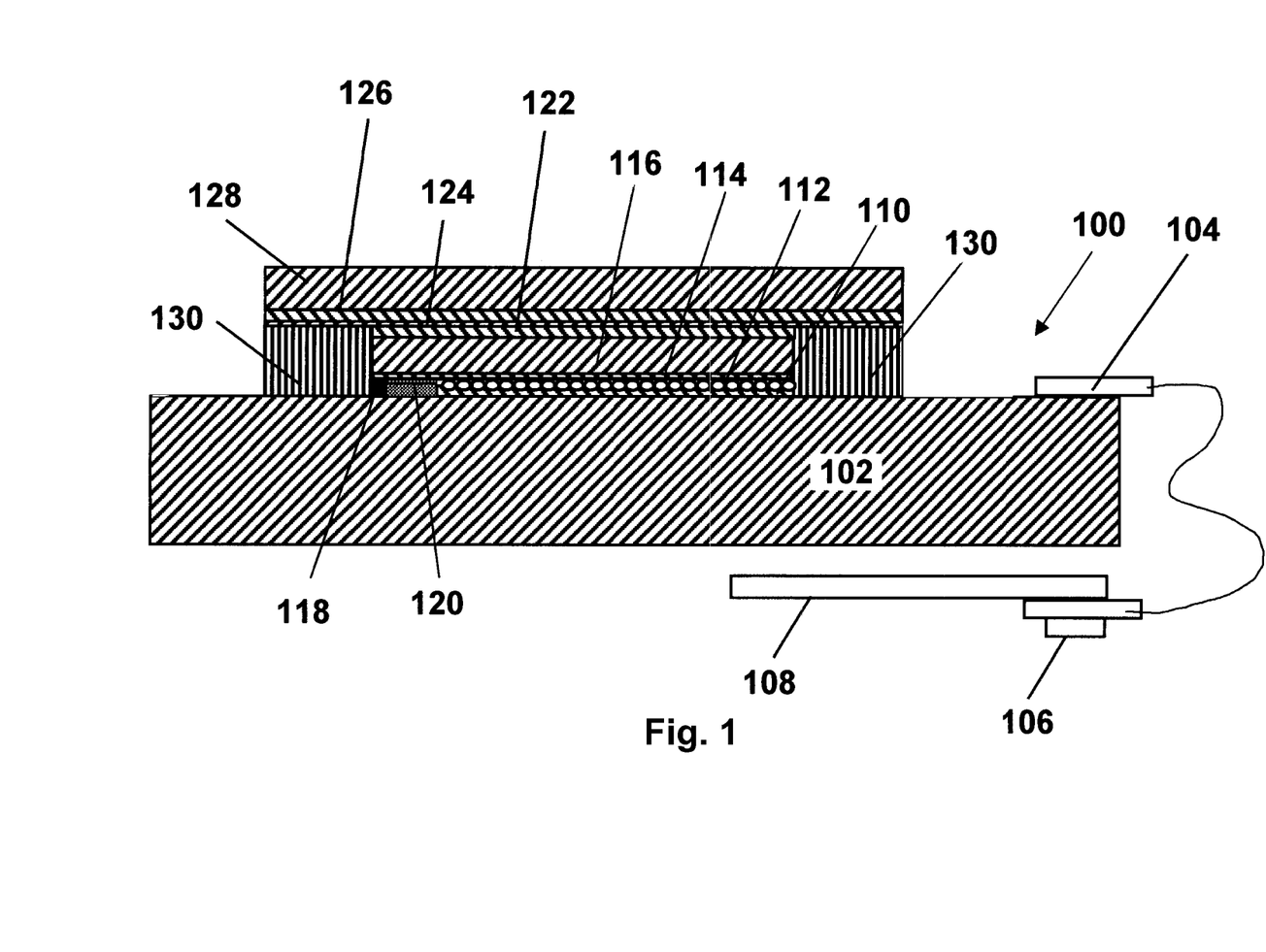

FIG. 20 of this patent, which is reproduced in modified form as FIG. 1 of the accompanying drawings, shows a preferred form of electro-optic display having front protective layers and an edge seal. As will be seen from the accompanying drawing, this preferred display (generally designated 100) comprises a thin film transistor (TFT) backplane 102 generally similar to backplanes used with liquid crystal displays and having a matrix of pixel electrodes and associated thin film transistors and conductors for independently controlling the voltage applied to the pixel electrodes; the pixel electrodes and conductors are omitted from FIG. 1 for clarity. A tape connect package 104 is connected to a peripheral portion of the backplane 102 and is provided with a driver integrated circuit 106 (which controls the operation of the display 100); the tape connect package 104 is also connected to a printed circuit board 108 which contains additional circuitry for controlling the operation of the display 100.

On the upper surface (as illustrated in FIG. 1) of the backplane 102 are disposed a layer 110 of lamination adhesive, a layer 112 of an electro-optic medium (illustrated as an encapsulated electrophoretic medium as described in the aforementioned E Ink and MIT patents and published applications, although other types of electro-optic media can also be used), a front electrode 114 and a front substrate 116; the front electrode 114 and front substrate 116 are both conveniently formed from an indium-tin-oxide coated polymeric film, and such coated films are readily available commercially. The layers 110 and 112, the front electrode 114 and front substrate 116 are all derived from a front plane laminate which has been laminated to the backplane 102. It will be seen from FIG. 1 that one portion (the left-hand end as illustrated) of the front electrode 114 and front substrate 116 extend beyond the electro-optic layer 112, and in the extended portion of the front electrode 114 and front substrate 116, a conductive via 118 formed from silver ink electrically connects the front electrode 114 to circuitry provided on the backplane 102, while an adhesive layer 120 secures the extended portion of the front electrode 114 to the backplane 102.

Over the front substrate 116 are disposed in succession a first layer 122 of optically clear adhesive, a barrier film 124, a second layer 126 of optically clear adhesive and a further, relatively thick protective film 128 provided on its exposed surface with an anti-glare coating (not shown). The protective film 128 acts to block ultra-violet radiation from reaching the electro-optic layer 112, and also prevents atmospheric moisture or other contaminants reaching this layer.

In order to form a complete seal around the electro-optic layer 112, the barrier film 124, the second layer 126 of optically clear adhesive and the protective film 128 are all made larger in both dimensions than the front substrate 116, so that the layers 124, 126 and 128 have peripheral portions which extend or "overhang" the outer edges of the front substrate 106. To complete the sealing of the electro-optic layer 112, a curable edge sealing material is injected, typically via a needle dispenser, into the area of the overhang, and cured to form an edge seal 130 completely surrounding the electro-optic layer 112.

The type of edge seal shown in FIG. 1 is effective in preventing ingress of moisture and other environmental contaminants into the electro-optic medium. However, one of the advantages of encapsulated electrophoretic and other electro-optic media, for example rotating bichromal member and microcell media, is that they are sufficiently flexible to be used in flexible displays. The type of edge seal shown in FIG. 1, and similar edge seals, are not suitable for use in flexible displays since the edge seal itself imparts rigidity to the display.

Accordingly, there is thus a need for an edge seal which can be used in flexible electro-optic displays, and one aspect of the present invention seeks to provide such an edge seal.

The present invention also relates to processes for the assembly of electro-optic displays. As discussed in the aforementioned U.S. Pat. No. 6,982,178, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

The teaching in U.S. Pat. No. 6,982,178 and 2004/0155857 regarding front plane laminates and double release films has been summarized above. In the production of such front plane laminates and double release films, the electro-optic medium is typically coated on to a flexible plastic substrate using an efficient roll-to-roll process. Pieces of the front plane laminate or double release film may be cut to size from the resultant roll and laminated, typically to a glass-based or other rigid backplane, using a roll lamination or similar process that relies upon the flexibility of the plastic substrate. However, it is sometimes necessary to incorporate electro-optic media into displays which use two rigid substrates, for example a rigid glass backplane and a rigid glass front substrate incorporating a color filter. In a second aspect, the present invention provides various improvements in processes and designs useful in preparing electro-optic displays having two rigid substrates, or at least a rigid front substrate (i.e., the substrate remote from the backplane).

SUMMARY OF INVENTION

Accordingly, in one aspect this invention provides an electro-optic display comprising:
 a backplane;
 a layer of electro-optic material disposed adjacent the backplane;
 a protective layer disposed on the opposed side of the layer of electro-optic material from the backplane; and
 a sealing layer of a metal or a ceramic contacting the backplane and the protective layer and extending therebetween, thus sealing the layer of electro-optic material from the outside environment.

For convenience, this type of electro-optic display may hereinafter be called a "sealed electro-optic display" of the present invention. Also, for convenience, the layer of metal or ceramic used in the display may hereinafter be called the "sealing layer". This sealing layer is preferably vapor deposited. In general, metal sealing layers are preferred over ceramic layers in flexible displays, since ceramic sealing layers may be susceptible to brittle fracture. The protective layer may comprises at least one electrode which is not in electrical contact with the metal sealing layer. As discussed in more detail below, a layer of insulating material may be disposed between the metal sealing layer and the at least one electrode to prevent shorting therebetween. Alternatively, the at least one electrode may terminate some distance from the edge of the protective layer.

For reasons discussed in detail below, a layer of a flexible barrier material may be disposed between the sealing layer (on the one hand) and the backplane, layer of electro-optic material, and protective layer (on the other hand). The thickness of the layer of flexible barrier material, measured parallel to the backplane, may decrease from the backplane to the protective layer.

In one form of the sealed display of the invention, the backplane has a substantially planar surface facing the electro-optic material, and the protective layer has a substantially planar front surface remote from the electro-optic material and extending substantially parallel to the planar surface of the backplane, and the sealing layer extends across a peripheral portion of the front surface of the protective layer.

The sealed display of the present invention may make use any of the types of electro-optic medium previously described. Thus, for example, in the sealed display the electro-optic material may comprise a rotating bichromal member or electrochromic material. Alternatively, the electro-optic material may comprise an electrophoretic material comprising a plurality of charged particles disposed in a fluid and capable of moving therethrough on application of an electric field to the fluid. The fluid may be gaseous. The charged particles and the fluid, whether liquid or gaseous, may be confined within a plurality of capsules or cells.

This invention also provides a process for sealing an electro-optic display, the process comprising:

providing an electro-optic display comprising a backplane; a layer of electro-optic material disposed adjacent the backplane; and a protective layer disposed on the opposed side of the layer of electro-optic material from the backplane; and vapor depositing a metal or a ceramic to form a sealing layer contacting the backplane and the protective layer and extending across the gap, thus sealing the layer of electro-optic material from the outside environment.

As previously mentioned, in such a process it is generally preferred that the sealing layer comprise a metal. The protective layer may comprise at least one electrode and the process may further comprise depositing a layer of insulating material over the at least one electrode, and thereafter depositing the metal sealing layer over the insulating layer. Alternatively or in addition, the process may further comprise placing a layer of a flexible barrier material over edge portions of the backplane, the layer of electro-optic material, and the protective layer, and thereafter depositing the sealing layer over flexible barrier material.

In another aspect, this invention provides a process for depositing an electro-optic material on a substrate, the process comprising:

placing the substrate and a disposable member on a substantially flat support surface, with the disposable member lying adjacent the substrate, the disposable member having a thickness perpendicular to the support surface substantially the same as that of the substrate; and moving a coating means relative to the support surface such that the coating means passes over the disposable member and thereafter over the substrate, the coating means depositing the electro-optic medium material on the substrate and at least a portion of the disposable member adjacent the substrate.

In one form of this coating process, the substrate comprises a color filter array.

Finally, this invention provides a sub-assembly for use in forming an electro-optic display, the sub-assembly comprising:

a layer of electro-optic material having first and second surfaces on opposed sides thereof;

a release sheet covering the first surface of the layer of electro-optic material, the release sheet being permeable to water vapor; and a cover member covering the second surface of the layer of electro-optic material.

BRIEF DESCRIPTION OF DRAWINGS

As already indicated, FIG. 1 of the accompanying drawing is a schematic section through part of a prior art edge-sealed electro-optic display.

DETAILED DESCRIPTION

As indicated above, the present invention has several different aspects, which will be described separately below. However, it should be noted that a single electro-optic display may make use of more than one aspect of the present invention; for example, an electro-optic display could have its electro-optic medium coated by a coating process of the present invention and be edge sealed using an edge seal of the present invention. Similarly, one aspect of the present invention relates to coating of electro-optic media on to substrates to form an electro-optic medium/substrate sub-assembly, while a further aspect relates to lamination of such a sub-assembly to a rigid substrate. A process which uses a non-coatable electro-optic medium (for example, the aforementioned type of electrochromic medium) may make use of the latter aspect of the invention but not the former.

Section A: Edge Seal for Electro-Optic Display

As already mentioned, the present invention provides a process for providing an edge seal in an electro-optic display. The display comprises a backplane; a layer of electro-optic material disposed adjacent the backplane; and a protective layer disposed on the opposed side of the layer of electro-optic material from the backplane. In accordance with the present invention, a sealing layer of a metal or a ceramic is formed (typically be vapor deposition) contacting the backplane and the protective layer and extending across the gap, thus sealing the layer of electro-optic material from the outside environment.

As will be apparent from the foregoing discussion of FIG. 1, the protective layer of an electro-optic display will typically include at least one electrode, usually referred to as the "front" electrode. When a metal sealing layer is used, it is normally necessary to ensure that the metal sealing layer is not in electrical contact with the front electrode, in order to ensure that the metal sealing layer does not create an electrical short between the front electrode and electrical components (for example, thin film transistors or connectors) present on the backplane. There are at least two approaches to avoiding such electrical shorts. As illustrated below with reference to FIG. 3, a layer of insulating material may be deposited underneath the metal sealing layer, so that the metal sealing layer is physically separated from the front electrode, and possibly also from electrical components present on the backplane. Also, the protective layer may extend beyond the edge of the layer of electro-optic material, thereby defining a peripheral region in which a gap exists between the protective layer and the backplane, and the insulating material may be introduced into this gap. Alternatively or in addition, the front electrode may terminate some distance from the edge of the protective layer so that a metal sealing layer does not contact the front electrode.

Obviously, to ensure any effective seal it is necessary that the sealing layer adhere to the portions of the display with which it is in contact. These portions of the display may comprise a number of different materials with radically differing surface characteristics. For example, if the display is an encapsulated electrophoretic display as described in the aforementioned E Ink and MIT patents and published applications, the sealing material will typically contact the backplane (which may itself have multiple types of exposed areas), the electrophoretic medium and the protective layer. At least in some cases, it may be difficult to ensure that the sealing layer adheres sufficiently to these differing surfaces, it may be desirable to first coat the edge of the display with a layer of a flexible barrier material (which contacts the backplane, electro-optic medium and protective layer) and then to deposit the sealing layer over this layer of barrier material. The use of a barrier material may also help to smooth some of the sharp edges on the display, thus providing a smoother surface which may facilitate deposition of the sealing layer. The barrier material may also serve as the insulating layer electrically insulating a metal sealing layer from electrodes present in the display, as described above.

Vapor deposition of the sealing layer in the process of the present invention is well within the abilities of those skilled in contemporary vapor deposition technology. For example, the present process could be carried out using a table rotating about a non-vertical axis so that the surface on which the sealing layer is to be deposited is substantially vertical. The optimum table rotation speed will of course vary with the particular sealing material used and is best determined empirically. A plurality of displays, with the areas on which it is not desired to deposit the sealing layer masked, can be placed on the table and the sealing layer applied thereto in a single operation, thus enabling high throughput. Accurate placement of the masking material on the displays is of course required, but the necessary accuracy is no greater than is required at other stages in the construction of the displays, for example lamination of the backplane to the other components of the display.

As will readily be apparent to those skilled in the construction of electro-optic displays, the "protective layer" of the display formed by the present process may be a composite of several separate layers. For example, in the display shown in FIG. 1, the barrier film 124, the layer 126 of optically clear adhesive and the protective film 128 may all be regarded as part of the "protective layer". Obviously, the exact number and type of layers present within the "protective layer" is essentially irrelevant for purposes of the present invention. Thus, the exact form of "protective film" used in the present process can vary widely depending upon the exact type of protection needed by the specific electro-optic material being used. For ease of illustration, the protective layer is illustrated in FIGS. 2 and 3 of the accompanying drawings as comprising only a front electrode layer and a single additional layer, but it should be understood that the present invention can be used with protective layers comprising multiple sub-layers.

The present invention is capable of achieving excellent sealing of electro-optic displays. For example, the water vapor permeability of one metallized polyester film was observed to be only 3.8 g m$^{-2}$ day$^{-1}$, even though the metal layer had numerous pin holes. The permeability is substantially less than that of cured polymer edge seals used in prior art displays, despite the poor metal layer, and substantially lower permeabilities can be achieved with good quality metal layers.

Figure 2:
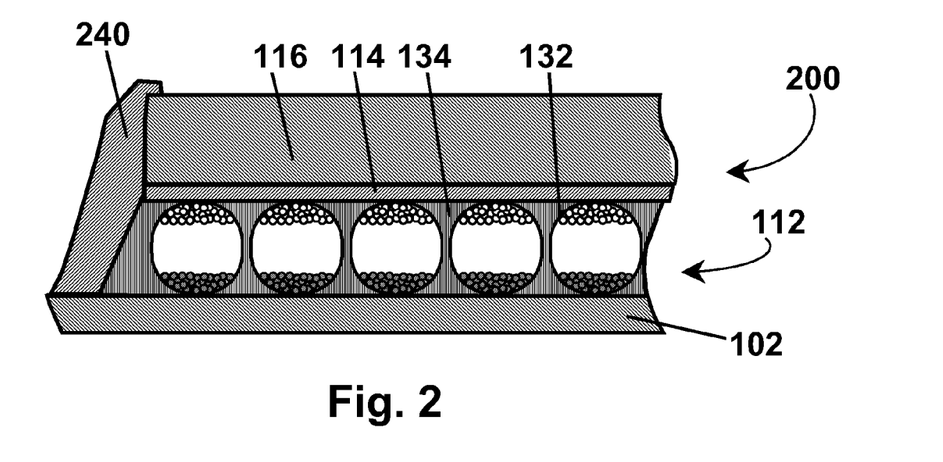
FIG. 2 is a schematic section through part of a first edge-sealed electro-optic display of the present invention.
Figure 3:
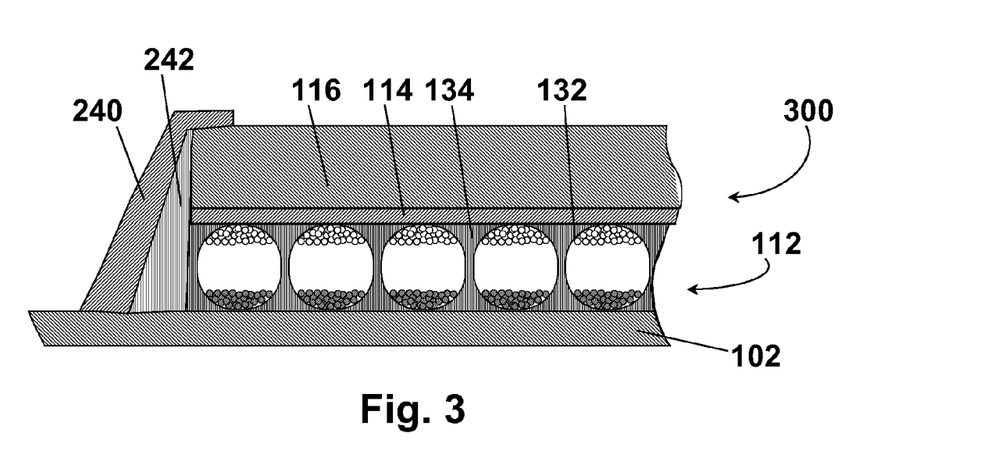
FIG. 3 is a schematic section, similar to that of FIG. 2, through part of a second edge-sealed electro-optic display of the present invention.

FIG. 2 illustrates a schematic section through a peripheral portion of a first electro-optic display (generally designated 200) of the present invention. The display 200 comprises a backplane 102 on which is disposed an electrophoretic medium (generally designated 112) comprising capsules 132 disposed within a binder 134. The display 200 further comprises a front electrode 114 and a front substrate or protective layer 116.

The various elements of the display 200 described thus far are similar to the corresponding elements of the display 100 shown in FIG. 1. However, the display 200 further comprises a vapor deposited sealing layer 240, which may be formed of a ceramic. Although not shown in FIG. 2, the sealing layer 240 extends completely around the periphery of the display 200, thus sealing the electrophoretic medium 112 from the outside environment. The sealing layer 240 extends from a peripheral portion of the backplane 102 to the edge of the protective layer 116, and thus contacts the backplane 102, the binder 134, the front electrode 114 and the protective layer 116. In practice, as illustrated in FIG. 2, the sealing layer 240 extends a short distance over a peripheral portion of the front surface of the protective layer 116 (i.e., the surface of the protective layer 116 remote from the electrophoretic medium 112 and extending parallel to the plane of the backplane 102). This overlap of the sealing layer over the front surface of the protective layer improves sealing and also helps to ensure that the sealing layer will not detach from the protective layer.

The contact between the sealing layer 240 and the electrode 114 shown in FIG. 2 does not cause a problem when the sealing layer 240 is ceramic but may cause problems when the sealing layer is formed from a metal. FIG. 3 illustrates a second sealed display (generally designated 300) of the present invention which is generally similar to the display 200 shown in FIG. 2 except that a layer 242 of a flexible barrier material is disposed between the sealing layer 240 and the adjacent portions the electrophoretic medium 112, the front electrode 114 and the protective layer 116. The flexible barrier layer 242 is of substantially triangular cross-section (i.e., the thickness of the barrier layer, measured parallel to the plane of the backplane, decreases from the backplane towards the protective layer). The barrier material layer 242 provides a smooth, uniform surface on which the sealing layer 240 can be deposited, thus assisting adhesion of the sealing layer 240 to the other layers of the display 300, and assisting in the formation of a continuous sealing layer free from pin holes or other defects. In addition, if the sealing layer 240 is metallic, the interposition of the insulating barrier material layer 240 between the sealing layer 240 and the front electrode 114 ensures that these two conductive layers are insulated from each other. The sealing layer 240 extends over the "front" edge (the top edge as illustrated in FIG. 3) of the barrier material layer 240 and over the peripheral portion of the protective layer 106; as in the display 200 shown in FIG. 2, this extension of the sealing layer 240 helps to ensure a good seal and to ensure that the sealing layer does not detach from the protective layer.

Section B: Coating Electro-Optic Media on to Rigid Substrates

Encapsulated electrophoretic media (referred to in some of the aforementioned E Ink and MIT patents and published applications as "electronic ink"), and other coatable electro-optic media may be applied to a rigid substrate in various ways. In the approach adopted in the coating process of the present invention, the substrate, which may be of glass or another rigid material, may be placed upon a flat surface (hereinafter referred to as a "table" or "coating table" surface) and a coating die, head or similar device may be translated across the surface to deposit the electro-optic medium. Such a process is functionally equivalent to the process described in some of the aforementioned E Ink and MIT patents and published applications, whereby a substrate is moved past a coating die which deposits an encapsulated electrophoretic medium on the substrate. If the substrate is smaller than the surface of the coating table, a disposable member (shim) having substantially the same thickness as the substrate may be placed adjacent one or more edges of the substrate to facilitate the creation of a uniform layer of the electro-optic medium, which might otherwise be disrupted by the changes in level at the edges of the substrate.

Figure 4:
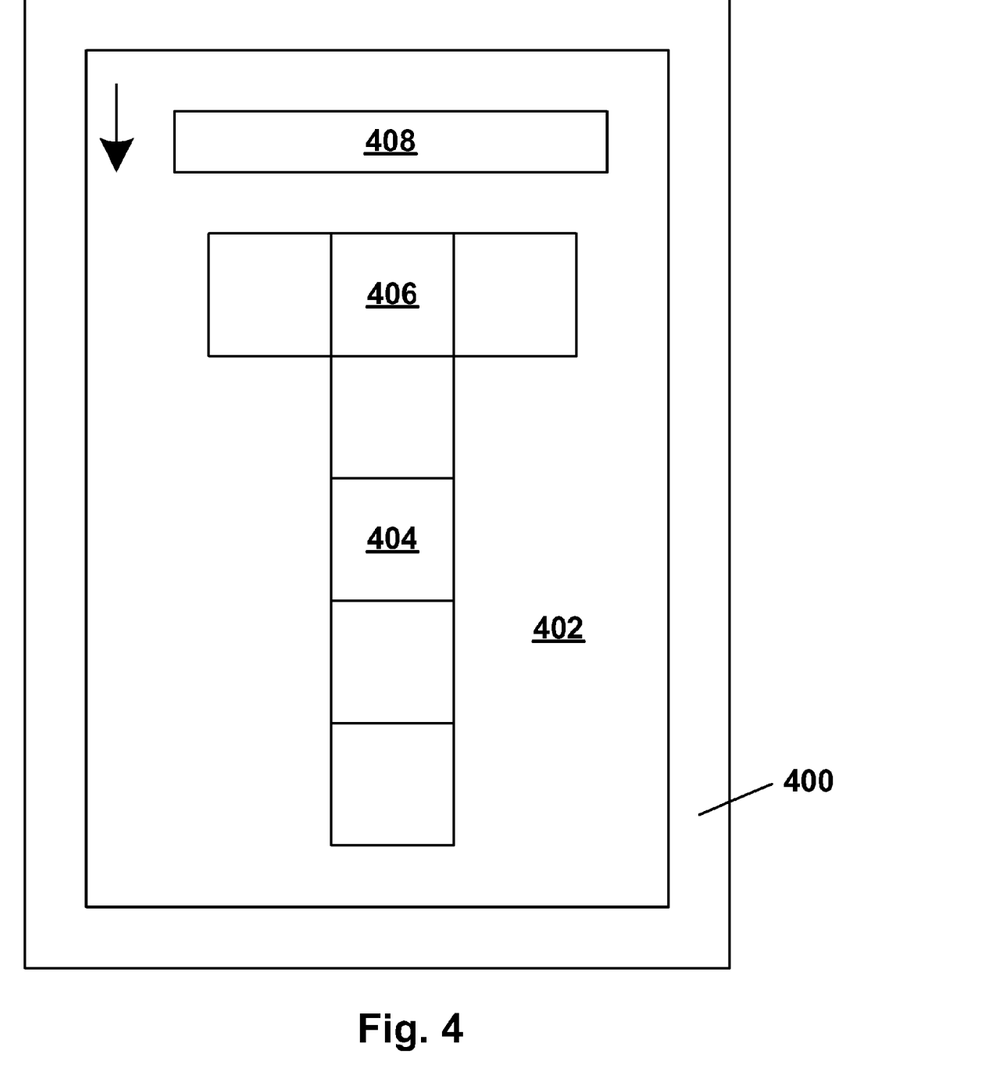
FIG. 4 is a schematic top plane view of a coating process of the present invention.

FIG. 4 of the accompanying drawings illustrates a preferred process of this type, in which coating is effected on a color filter array. However, it should be noted that the present process is not confined to coating on such a substrate and a wide variety of substrates may be used. For example, the substrate used may be a transparent rigid plate covered with an unpatterned electrically conductive layer, or could be the backplane of an electro-optic display. Indeed, various processes of the present invention can also be used to coat on flexible substrates. This process uses a coating table 400 with vacuum capability; to this table 400 is applied a tack film 402, the vacuum being applied to hold the tack film 402 flat on the table 400 with its tacky side facing upwardly, away from the table surface. A color filter array plate (CFA plate) 404 and sacrificial rigid substrates (SRS, or disposable members) 406 of substantially the same thickness as the CFA plate 404 are placed on the tack film 402, which holds them flat on the table 400 with minimal variations in height. The SRS 406 are placed adjacent and "upstream" of the CFA plate 404 so that a coating die 408, which moves downwardly (as indicated by the arrow in FIG. 4) passing over the SRS 406 before reaching the CFA plate 404, thus allowing clean and uniform coating of the CFA plate. The coating die 408 coats the coating region shown in FIG. 4; at the end of this coating process, the CFA plate 404 is removed from the tack film 402 and sent for further processing as described below, the SRS 406 are removed and recycled and the used tack film 402 is discarded.

Alternatively, as described in the aforementioned U.S. Pat. No. 6,982,178 and Publications 2004/0155857 and 2005/0105159, the electro-optic medium may be coated on to a first substrate (typically a release film) having surface properties such that the final coated layer of electro-optic medium (after any necessary drying, curing or similar operation) can be peeled from the substrate with relatively little mechanical effort. The final coated layer of electro-optic medium may then be laminated to an adhesive layer formed on a second substrate (which may also be a release film), such that the peel strength between the adhesive layer and the second substrate is greater than that between the electro-optic medium and the first substrate, but still low enough to allow the adhesive layer and the second substrate to be separated without undue effort or damage to the adhesive layer. The first substrate can then be peeled from the second substrate/adhesive/electro-optic medium assembly, and the electro-optic medium laminated to a color filter array plate (or other front layer) with application of heat and/or pressure. Alternatively, after peeling the first substrate from the electro-optic layer, the electro-optic layer may be laminated to a second layer of adhesive, typically carried on a release film; see, for a more extensive discussion on this point, U.S. Application Ser. No. 60/596,743, filed Oct. 18, 2005.

In some cases, it may be necessary to provide a second adhesive layer either on the electro-optic medium layer or on the CFA plate to ensure adequate adhesion. However, as described in the aforementioned 2005/0105159, in a preferred form of this process, the electro-optic medium is an encapsulated electrophoretic medium comprising a flowable binder, which also acts as an adhesive, thus eliminating the need for a separate adhesive layer. In such a process, typically the binder is present in a proportion substantially larger than when a separate adhesive layer is used. Finally, the second substrate can be removed from the adhesive layer, and the CFA plate/electro-optic medium/adhesive layer sub-assembly laminated to a backplane.

The processes described in the two preceding paragraphs may be modified by first laminating the electro-optic layer to a backplane, leaving an adhesive layer on the opposed side of the electro-optic layer from the backplane, and thereafter (after removal of any release sheet covering this adhesive layer) laminating the adhesive layer to a front substrate, which may be a color filter array or other type of front substrate. Again, for a more extensive discussion, the reader is referred to the aforementioned Application Ser. No. 60/596,743.

This type of process may, as in the aforementioned 2004/0155857 and 2005/0105159, be referred to as a "double release" process because it employs two substrates or release films which are removed sequentially. Obviously, the order in which the two release films are removed could be reversed, so that the electro-optic medium is first laminated to the backplane and only later to the CFA plate or other front layer.

Another approach to construction of a CFA plate/electro-optic medium/backplane display is to first laminate an electro-optic medium layer to a CFA plate, separately laminate an adhesive layer to a backplane, and then laminate the CFA plate/electro-optic medium and adhesive/backplane sub-assemblies together.

Additional refinements to these processes are possible. For example, the electro-optic medium layer may be cut to a specific size before beginning the lamination process, allowing, for example, a clear border area around the edge of the backplane or front layer. Also, apertures may be formed in the electro-optic medium layer, for example to allow an electrical connection between a front electrode and the backplane. In processes where several physically distinct portions of electro-optic medium are present between a front layer and a backplane (i.e., in a "multi-up" display fabrication process), the individual portions of electro-optic medium may be laminated individually to one of the front layer and backplane by applying a localized lamination process, before removing all of the remaining release films and performing the second lamination. Alternatively, multiple portions of electro-optic medium may be attached to a single carrier sheet via mechanical attachment, adhesive, or other method, and then this carrier sheet aligned with one of the front layer and backplane, after which the lamination of all of the portions of electro-optic medium can be accomplished simultaneously. In either case, the intermediate result is a rigid substrate carrying a number of physically distinct portions of electro-optic medium, each covered with a release film, in registry with predetermined regions of the substrate. In practice it has been found that registration to a tolerance of about ±200 μm is necessary.

One preferred form of lamination process uses a device capable of laminating a front plane laminate, double release film or other structure containing the electro-optic layer, one piece at a time to a substantially larger component, which will typically be carried on a platen. The lamination device is translated relative to the platen (it is of course irrelevant which integer actually moves). At each of series of predetermined locations, a single piece of the front plane laminate etc. is loaded into the lamination device and laminated to the other component. The lamination device will typically be equipped with heating means to apply localized heat to the other component in the location to which the single piece of FPL etc. will be laminated, without applying heat to the entirety of the other component.

Section C: Use of Water Vapor Permeable Release Sheets

As already indicated, another aspect of the present invention relates to sub-assemblies for use in producing electro-optic displays, these sub-assemblies comprising a layer of electro-optic material and a release sheet which is permeable to water vapor.

It has been found that it is often advantageous to use release films which are permeable to water vapor. As noted in some of the aforementioned E Ink and MIT patents and published applications, some electro-optic media are sensitive to water vapor (in the sense that the electro-optic characteristics of the medium vary depending upon its water content), and using a water vapor permeable release film may allow conditioning of the electro-optic medium, and possibly any associated adhesive layer, to a desired water content while these layers are still covered by their associated release films. This is very convenient from a manufacturing point of view, since the use of water vapor permeable release sheets allows the release sheet to be applied during the manufacturing process used to deposit the other layers of the sub-assembly, while allowing later conditioning of the electro-optic material to a desired water content, rather than requiring that the conditioning be effected first and the release sheet applied in a separate later step. Furthermore, use of a water vapor permeable release sheet may allow certain combinations of process steps which raise problems with non-permeable release sheets. For example, if it desired to form a sub-assembly by coating an electro-optic material on a first release sheet, coating an adhesive layer on a second release sheet and laminating the electro-optic material to the adhesive layer with the release sheets on either side of the resultant sub-assembly, if the release sheets are impermeable it may be difficult to control the final water content of the electro-optic material, since water may migrate in either direction between the electro-optic material and the adhesive within the laminated sub-assembly. If, however, one or both of the release sheets is permeable to water vapor, conditioning of the laminated sub-assembly is readily effected, and the final water content of the electro-optic material can thus be closely controlled.

The water vapor permeable release sheet used in the present invention should have a water vapor transmission rate (WVTR) of not less than about 0.5 g m$^{-2}$ day$^{-1}$, preferably not less than about 1 g m$^{-2}$ day$^{-1}$, and desirably not less than about 5 g, m$^{-2}$ day$^{-1}$. Release sheets meeting these requirements are available commercially, for example from CP Films of Martinsville Va.

In most cases, it is desirable that the release sheet used in the present invention include a conductive layer to enable the sub-assembly to be tested in the ways described in the aforementioned patent and publications. Typically, it is desirable that the conductive layer be light transmissive to enable changes in the optical state of the electro-optic layer to be observed through the release sheet. In some cases, for example when the sub-assembly is a double release film with two release sheets on opposed sides thereof, one the release sheets can bear the conductive layer and the other be water vapor permeable, since this permits the use of types of conductive layers, for example metal films, which are not compatible with water vapor permeability. A release sheet which is both water vapor permeable and has a conductive layer can be formed by coating a water permeable base release sheet with a conductive polymer (for example, that sold commercially under the Registered Trade Mark "BAYTRON") or a conductive metal oxide (for example, indium tin oxide).

The sub-assembly of the present invention can include any sub-assembly useful in the construction of electro-optic displays and comprising a layer of electro-optic material and a release sheet. Zero, one or more layers of other materials may be present between the layer of electro-optic material and the release sheet. For example, the sub-assembly may be a front plane laminate as described in the aforementioned U.S. Pat. No. 6,982,178 and comprise a light-transmissive electrically-conductive layer; a layer of a solid electro-optic medium in electrical contact with the electrically-conductive layer; an adhesive layer; and the release sheet. Alternatively, the sub-assembly may be a double release film as described in the aforementioned 2004/0155857, and comprise a layer of a solid electro-optic medium having first and second surfaces on opposed sides thereof; a first adhesive layer on the first surface of the layer of solid electro-optic medium; a (first) release sheet disposed on the opposed side of the first adhesive layer from the layer of solid electro-optic medium; and a second adhesive layer on the second surface of the layer of solid electro-optic medium. In a preferred form, this double release film further comprises a second release sheet disposed on the opposed side of the second adhesive layer from the layer of solid electro-optic medium. In this preferred form, either or both of the release sheets may be water vapor permeable. The sub-assembly may also be in the alternative form of double release film described in the aforementioned 2004/0155857, and comprise a layer of a solid electro-optic medium having first and second surfaces on opposed sides thereof; a first release sheet covering the first surface of the layer of solid electro-optic medium; and a second release sheet covering the second surface of the layer of solid electro-optic medium. Again, either or both of the release sheets may be water vapor permeable.

Section D: Laminating Rigid Substrates Together

Consideration will now be given to the problem of affixing a rigid substrate carrying one or more portions of electro-optic medium to another rigid substrate. Two principal problems need to be considered, namely avoiding voids during lamination, and alignment.

To achieve a lamination free from voids (i.e., air bubbles or other types of area in which the two surfaces being laminated fail to adhere to each other), the two parts being laminated may be brought into face-to-face alignment in near contact. One or both parts may be heated at this point. Next, the parts are brought into contact and mechanical pressure is applied across the surface of both parts. This pressure may be applied by the use of a platen or flexible bladder. In order to minimize the production of air bubbles, this process may take place substantially under vacuum, e.g. the atmosphere may be removed from the region between the two parts before they are brought into contact. Application of vacuum between the parts, combined with the atmospheric pressure applied to the two parts, may provide sufficient force to achieve the lamination. Pressure may also be applied to the parts locally, by a roller on one side pressing against a platen on the other, or by two rollers located on opposed sides of the two parts. In some cases, it may be desirable to control relative humidity during the lamination process to achieve optimal electro-optical performance in the resulting display.

When a color filter is present in a display, it is of course necessary to ensure that the various areas of the color filter are correctly aligned with the sets of electrodes designed to drive the pixels associated with each area of the color filter. In order to achieve alignment between the two parts, the parts may first be aligned by aligning a set of marks on the two parts while these parts are brought close to each other. This alignment may be detected by using an optical camera mounted above or below the parts. The alignment may be continually refined as the parts are brought into mechanical contact. The alignment may be physically achieved by rotating or translating one or both parts with respect to each other.

After the electro-optic medium and adhesive have been laminated to the CFA plate, an ultraviolet- or heat-curable sealant may be applied to the edge of the resultant sub-assembly. The sealant can be dispensed in various locations from as little as two small dots at diagonally opposed corners of the sub-assembly up to almost a complete edge seal with a small gap or gaps for venting during lamination. This sub-assembly and the backplane (or backplane sub-assembly) are brought close to one another without touching and aligned in x, y, and θ (i.e., in translation along the two axes parallel to the planes of the sub-assemblies, and in rotation about an axis perpendicular to this plane), and then pressed together while maintaining that alignment. The sealant is then cured. The resultant assembly may then be laminated using a roll laminator, a vacuum laminator, a heated platen press, or an auto-clave to form the final display. A combination of these lamination processes may be used to achieve a void-free lamination.

The gap between the two sub-assemblies being laminated may be controlled precisely by including known diameter spacers (for example, compressible polystyrene spheres) between the sub-assemblies, for example in the sealant.

Once the sub-assemblies are in physical contact, if more precise alignment is required, heat may be applied to the assembly to soften the adhesive, and one or both sub-assemblies may be translated and/or rotated to achieve the desired final alignment. This process may be done substantially at the same time as the initial lamination of the two sub-assemblies, or it may be done at a different time and/or in a different apparatus. After adjustments have been made to the alignment, the final position can be secured by curing at least part of the sealant that was dispensed between the sub-assemblies prior to the lamination operation.

Finally, in most cases an edge seal will be applied to the display. The edge seal material may be dispensed around the edge of the display, and this material pulled into a cavity between the top and bottom substrates by capillary forces. This cavity may be created by attaching a third, over-sized film above the CFA plate (i.e., on the opposed side of this plate from the electro-optic medium). Alternatively, as mentioned above, the electro-optic medium may be pre-cut before lamination to the CFA plate in order to leave a cavity around the edge of the display, thus allowing the use of a "true under-fill" process, in which the edge seal material resides in a cavity approximately the combined thickness of the electro-optic medium/adhesive layers between the top and bottom substrates. Such an edge seal can offer improved resistance to moisture, because the "vertical" thickness of the sealant is reduced.

A specific process of this type will now be described, though by way of illustration only.

A mother sheet was prepared comprising a plurality of glass color filter array plates provided with a transparent front electrode, and cut to yield individual CFA plates. An encapsulated electrophoretic medium was coated on to the electrode-bearing surface of the CFA plates substantially as described in the aforementioned 2004/0027327 and dried to form a coherent layer of capsules on each CFA plate. Separately, a polyurethane adhesive was coated on to a release sheet and dried. The resultant dried adhesive layer was laminated to the dried electrophoretic medium layer, and thereafter the resultant sub-assembly was held under controlled temperature and humidity conditions to condition the electrophoretic medium. To prepare for lamination of this sub-assembly to an active matrix backplane, a conductive adhesive (which would eventually form a conductive via connecting the front electrode to the backplane) was dispensed on to the backplane, together with beads of a sealant. The aforementioned sub-assembly and the backplane were aligned, placed together and the sealant beads cured. The CFA-containing sub-assembly was then roll laminated to the backplane and the resultant display assembly autoclaved. An edge sealant was dispensed around the periphery of the electrophoretic medium and cured, and the final display thus produced autoclaved and subjected to quality inspection.

It will be apparent to those skilled in the art that numerous changes can be made in the specific embodiments of the present invention already described without departing from the scope of the invention. Accordingly, the whole of the foregoing description is to be construed in an illustrative and not in a limitative sense.

The invention claimed is:

1. A sub-assembly for use in forming an electro-optic display, the sub-assembly comprising:
   a layer of electro-optic material having first and second surfaces on opposed sides thereof;
   a release sheet covering the first surface of the layer of electro-optic material, the release sheet being permeable to water vapor; and
   a cover member covering the second surface of the layer of electro-optic material.

2. A sub-assembly according to claim 1 wherein the release sheet has a water vapor transmission rate of not less than about $0.5\ \text{g m}^{-2}\ \text{day}^{-1}$.

3. A sub-assembly according to claim 2 wherein the release sheet has a water vapor transmission rate of not less than about $1\ \text{g m}^2\ \text{day}^{-1}$.

4. A sub-assembly according to claim 3 wherein the release sheet has a water vapor transmission rate of not less than about $5\ \text{g m}^2\ \text{day}^{-1}$.

5. A sub-assembly according to claim 1 wherein the release sheet comprises an electrically-conductive layer.

6. A sub-assembly according to claim 5 wherein the electrically-conductive layer of the release sheet is light-transmissive.

7. A sub-assembly according to claim 1 wherein the cover member comprises a second release sheet and comprises an electrically-conductive layer.

8. A sub-assembly according to claim 1 wherein the cover member comprises an electrically conductive layer, and an adhesive layer is disposed between the layer of electro-optic material and the release sheet.

9. A sub-assembly according to claim 1 wherein the cover member comprises an adhesive layer and a second adhesive layer is disposed between the layer of electro-optic material and the release sheet.

10. A sub-assembly according to claim 9 wherein the cover member further comprises a second release sheet covering the surface of the adhesive layer remote from the layer of electro-optic material.

11. A sub-assembly according to claim 1 wherein the electro-optic material comprises a rotating bichromal member or electrochromic material.

12. A sub-assembly according to claim 1 wherein the electro-optic material comprises an electrophoretic material comprising a plurality of charged particles disposed in a fluid and capable of moving therethrough on application of an electric field to the fluid.

13. A sub-assembly according to claim 12 wherein the fluid is gaseous.

14. A sub-assembly according to claim 12 wherein the charged particles and the fluid are confined within a plurality of capsules or cells.

* * * * *